(Model.)

GASTON DE SCHRYNMAKERS DE DORMAEL.
ELECTRICAL ACCUMULATOR.

No. 561,872.  Patented June 9, 1896.

Witnesses
H. van Dedennees
E. A. Scott.

Inventor
Gaston de Schrynmakers de Dormael
by Richardson
Attorneys

UNITED STATES PATENT OFFICE.

GASTON DE SCHRYNMAKERS DE DORMAEL, OF BRUSSELS, BELGIUM.

ELECTRICAL ACCUMULATOR.

SPECIFICATION forming part of Letters Patent No. 561,872, dated June 9, 1896.

Application filed May 1, 1895. Serial No. 547,791. (Model.) Patented in Belgium May 12, 1894, No. 109,940, July 7, 1894, No. 110,857, July 11, 1894, No. 110,935, and July 17, 1894, No. 111,003; in Germany October 6, 1894, No. 82,711; in France January 7, 1895, No. 244,138; in England April 18, 1895, No. 77,095, and in Luxemburg April 18, 1895, No. 2,286.

*To all whom it may concern:*

Be it known that I, GASTON DE SCHRYNMAKERS DE DORMAEL, a subject of the King of Belgium, and a resident of Brussels, Belgium, have invented certain new and useful Improvements in Electrical Accumulators, of which the following is a specification.

Patents have been granted for this invention in Belgium, No. 109,940, dated May 12, 1894, No. 110,857, dated July 7, 1894, No. 110,935, dated July 11, 1894, and No. 111,003, dated July 17, 1894; in France, No. 244,138, dated January 7, 1895; in Germany, No. 82,711, dated October 6, 1894; in Great Britain, No. 77,095, dated April 18, 1895, and in Luxemburg, No. 2,286, dated April 18, 1895.

In my invention I place the negative collector, whether a plate or a sheath, against the peroxid itself without any interposition of insulating material. It results from this that the negative collector serves to retain in position the positive depolarizing matter. The only precaution to be observed in this case is to prevent metallic contact between this negative collector and the central positive collector which projects from the mass of peroxid. I thus obtain an accumulator or secondary-battery element which is protected against shocks and in which the internal resistance is reduced to a minimum.

Figure 2:
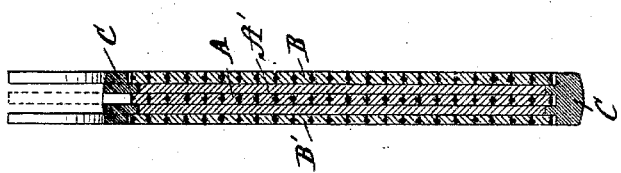
Figure 1:
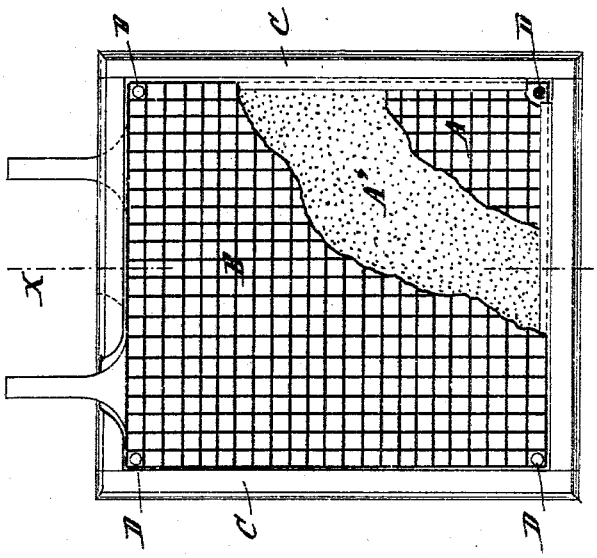

In the drawings, Figure 1 is a side view of the invention, and Fig. 2 is a sectional view thereof.

The element is composed as follows: Upon both sides of a plate of lead, surrounded by a rigid and insulating frame of material that is not affected by acids, is spread a layer of the depolarizing oxid paste, so as to be flush with the surrounding frame. The plate thus coated is either inclosed in two thin very finely-perforated leaden sheaths or it is strongly compressed between two plates of spongy lead of the same dimensions as the frame, so as to constitute two boxes in which the oxid of lead is confined. According to the intensity of the current to be obtained, one or more of these elements are placed in one and the same accumulator-tank. If there is used, as negative element, lead, the oxid of which is insoluble, there are juxtaposed alternately a positive element with a frame provided with peroxid, and a plate of spongy lead, terminating the series with two negative elements of spongy lead. The system is well secured together and care is taken to form under the upper part vent-holes for the escape of gases.

If metals with soluble oxids are employed, positive elements are used mounted in their sheaths, as above described, leaving between them a space in which carbon or other suitable material is introduced with the object of holding the parts in position. The cell is then charged with sulphate of zinc, of cadmium, of tin, of copper, or other metals, and after some time all this mass, which remains spongy, forms a whole united by the electrolytic action of the charge. The current from the positive pole is collected on the central collector which emerges from the positive material. The current from the negative material may be collected by ties connecting together all the sheaths or all the spongy plates when lead is employed.

To illustrate one form of my invention, reference is had to the accompanying drawings.

In the middle of a frame of ebonite or other non-conducting material (see the drawings) a metallic netting A is arranged, both surfaces of which are covered by a layer A' of oxid of lead, $(PbO^2)$. In the drawings the lead oxid has been broken away in one corner, so as to show the concealed netting A, the point of which projects outside of the oxid of lead. A netting B and B', covered with protoxid of lead, $(Pb.O,)$ is pressed tightly against each side of this netting A, covered with oxid of lead and forming the positive electrode of the battery. These two plates B and B', which constitute the negative electrode of the battery, are connected by four lead pins D in such a manner that they must repose against the plate A without the pins D touching the said plate A, the corners of which are provided with holes for receiving the same. The frame C incloses the plates, so that the oxid of lead cannot fall off. This is the manner in which one battery is made.

The frame C is a box, the two covers of which are formed by the negative plate.

Having thus described the nature of my said invention and the best means I know for carrying the same into practical effect, I claim—

1. An electro-accumulator having negative material therein and the depolarizing peroxid arranged in direct contact with the negative material, substantially as described.

2. An electric accumulator comprising a series of plates alternately positive and negative and the granular peroxid filling the intervals between the plates, substantially as described.

In witness whereof I have hereunto set my hand in presence of two witnesses.

GASTON DE SCHRYNMAKERS DE DORMAEL.

Witnesses:
ALBERT TRAIPONT,
GREGORY PHELAN.